Feb. 24, 1931.  P. N. DANN  1,793,911
GROUNDING FITTING FOR ELECTRIC SYSTEMS
Filed Feb. 7, 1928  2 Sheets-Sheet 2
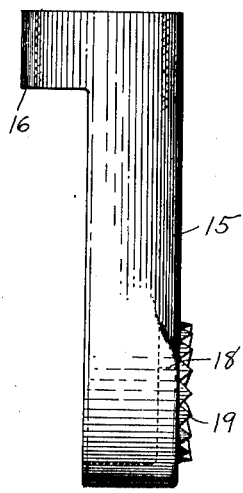
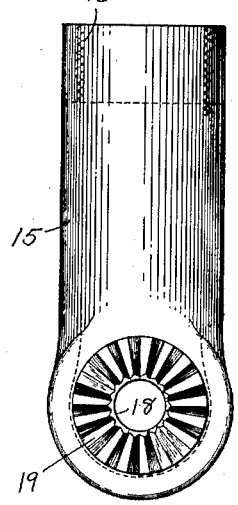
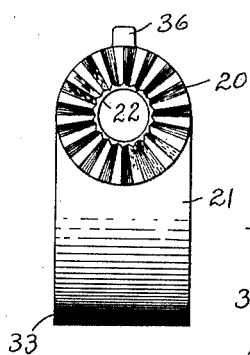
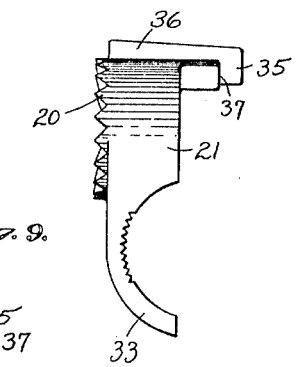
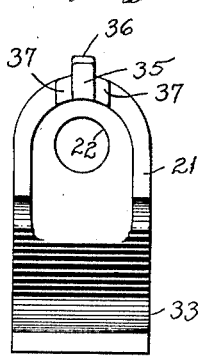

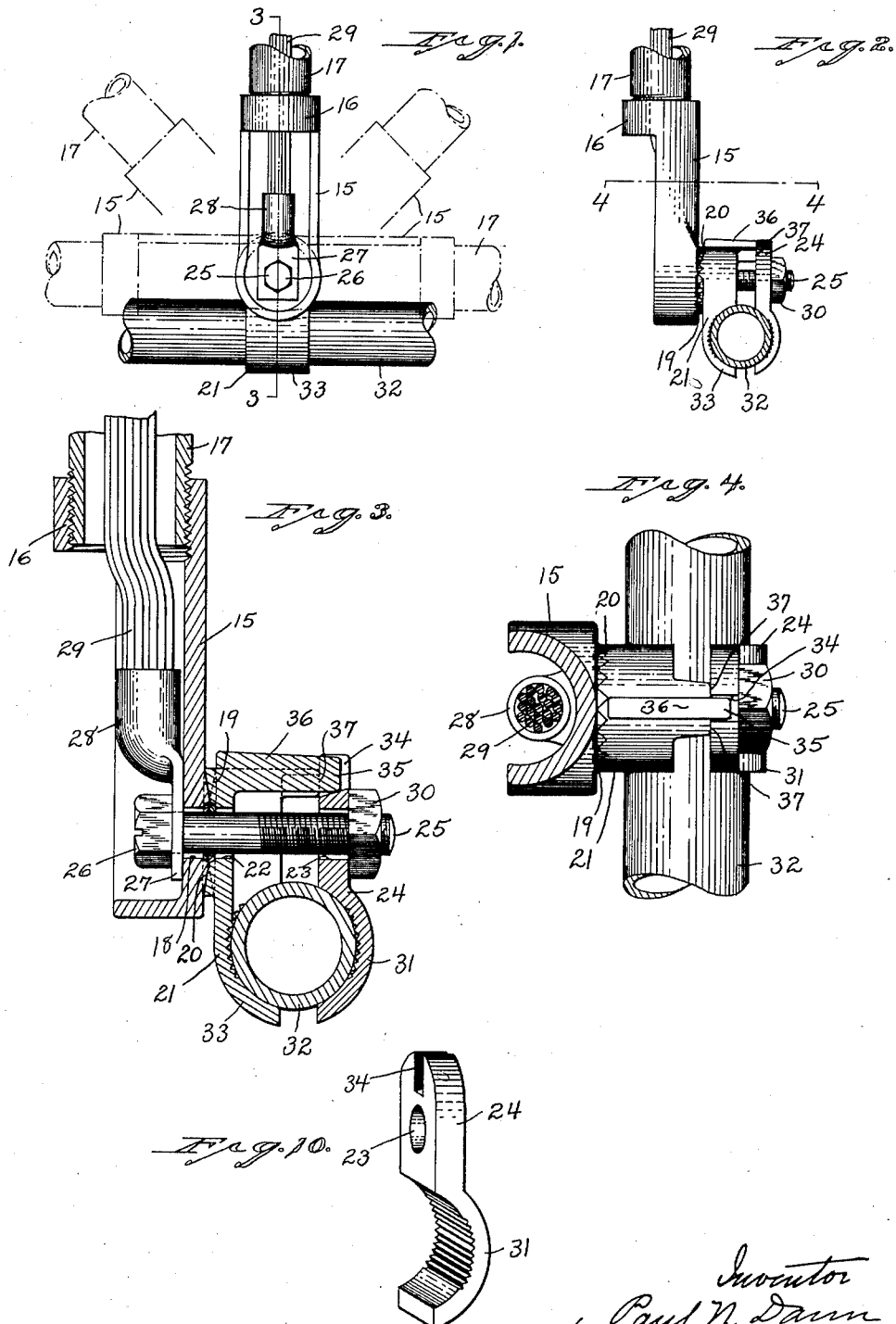

Patented Feb. 24, 1931

1,793,911

UNITED STATES PATENT OFFICE

PAUL N. DANN, OF NEW HAVEN, CONNECTICUT

GROUNDING FITTING FOR ELECTRIC SYSTEMS

Application filed February 7, 1928. Serial No. 252,489.

This invention relates to an improvement in grounding fittings for electric systems and has for its object the production of a simple and reliable fitting of the class described, constructed with particular reference to its adaptability for installation in a variety of positions with respect to a water-pipe or other grounding medium.

With this object in view, my invention consists in a grounding fitting for electric systems, comprising a conduit-supporting member provided with a socket adapted to receive one end of a conduit; a clamp adapted to grip a water-pipe or other grounding medium for electrically and mechanically connecting the said conduit-supporting member and conduit thereto; and means for pivotally connecting the said conduit-supporting member and clamp together; whereby the said conduit-supporting member and conduit may project from the said grounding medium at any one of a variety of angles to accommodate different installation requirements.

My invention further consists in a grounding fitting for electric systems characterized as above and having certain other details of construction and combinations of parts as will be hereinafter described and recited in the claims.

In the accompanying drawings:

Fig. 1 is a broken view in elevation showing my improved grounding fitting, together with a conduit, as installed upon a horizontal water-pipe, the conduit-supporting member thereof being shown by broken lines in a number of positions which it may assume with respect to the water-pipe;

Fig. 2 is a view thereof in side elevation;

Fig. 3 is an enlarged-scale sectional view thereof in longitudinal section on the line 3—3 of Fig. 1;

Fig. 4 is an enlarged-scale sectional view on the line 4—4 of Fig. 2;

Fig. 5 is a detached view in side elevation of the conduit-supporting member of my improved grounding-fitting;

Fig. 6 is a rear face view thereof;

Fig. 7 is a view in front elevation of the outer clamp member;

Fig. 8 is a view thereof in side elevation;

Fig. 9 is a view of the rear face thereof; and

Fig. 10 is a detached perspective view of the inner clamp member of my improved grounding fitting.

In carrying out my invention, as herein shown, I employ a cast-metal conduit-supporting member 15 substantially semicircular in cross-section and formed at one end with an internally-threaded cylindrical socket 16 for the reception of the externally-threaded end of a standard conduit 17 and at its opposite end with a bore 18 passing through the bottom wall at a right angle to the axis of the conduit 17. Cast integral with the rear face of the conduit-supporting member 15 is a circular series of rearwardly-facing radial locking-teeth 19 arranged concentrically around the bore 18 aforesaid and interengaging with a corresponding series of locking-teeth 20 formed upon the forward face of an outer clamp-member 21 around a bore 22 therein.

Passing through the bores 18 and 22 just above described, and through a coaxial bore 23 formed in an inner clamp-member 24, is a combined clamping and pivot bolt 25, beneath the head 26 of which is positioned the perforated tongue 27 of a standard terminal clip 28 into which is soldered the grounding cable 29 extending in the usual manner longitudinally through the conduit-supporting member 15 and outward through the conduit 17 before mentioned.

The threaded inner end of the bolt 26 has threaded upon it a nut 30, which bears against the rear face of the inner clamp-member 24, so as to force its bowed internally-serrated clamping-arm 31 against the periphery of a water-pipe 32 and, at the same time, forces the corresponding clamping-arm 33 of the outer clamp-member 21 against the opposite side of the said pipe. The draft of the bolt 25 serves to maintain the interengaging teeth 19 and 20 before described in engagement so as to prevent the conduit-supporting member 15 from turning with respect to the clamp which comprises the inner and outer clamp-members 21 and 24 aforesaid.

The upper end (as viewed in the drawings) of the inner clamp-member 24 is formed with a positioning-notch 34 receiving a positioning-tongue 35 inwardly projecting from a reinforcing-rib 36 cast integral with the curved upper wall of the clamp-member 21 aforesaid. On opposite sides of the positioning-tongue 35 just described the clamp-member 21 is formed with fulcrum-shoulders 37—37 against which the forward face of the clamp-member 24, adjacent the positioning-notch 34 therein, bears under the draft of the bolt 25.

By loosening the bolt 25 or its nut 30, the conduit-supporting member 15 of my improved grounding fitting may be swung about the axis of the said bolt, as indicated in Fig. 1, so as to align its socket 16 with a conduit projecting toward the water-pipe 32 from any given one of an almost infinite variety of angles, from which it will be seen that my improved grounding fitting is capable of adapting itself to the requirements of different types of installations in accordance with the exigencies of a situation. After the conduit-supporting member 15 has been positioned so as to align itself with the conduit, as above described, it may be firmly locked in such position for supporting the same by tightening the bolt 25 or its nut 30, so as to interlock the teeth 19 and 20.

I claim:

1. A grounding fitting for electric systems, comprising a conduit-supporting member provided with a socket adapted to receive one end of a conduit; a two-part clamp comprising a pair of complementary clamping-members each adapted at one end to grip a water-pipe or other grounding medium for electrically and mechanically connecting the said conduit-supporting member and conduit thereto and bearing one against the other at their opposite ends; and a bolt passing through both members of the said two-part clamp intermediate the ends thereof and through a portion of the said conduit-supporting member, so as to pivotally connect the same together and to clamp the two-part clamp upon a grounding medium; whereby the said conduit-supporting member and conduit may project from the said grounding medium at any one of a variety of angles to accommodate different installation requirements.

2. A grounding fitting for electric systems, comprising a conduit-supporting member provided with a socket adapted to receive one end of a conduit; a clamp adapted to grip a water-pipe or other grounding medium for electrically and mechanically connecting the said conduit-supporting member and conduit thereto, and comprising two complementary members, one of which is formed with a positioning-tongue and the other with a notch for the reception of the said tongue; and means operable to concurrently pivotally connect the said conduit-supporting member and clamp together and clasp the two members of the latter upon the said grounding medium; whereby the said conduit-supporting member and conduit may project from the said grounding medium at any one of a variety of angles to accommodate different installation requirements.

In testimony whereof, I have signed this specification.

PAUL N. DANN.